United States Patent [19]

DeVries

[11] 3,858,184

[45] Dec. 31, 1974

[54] AUTOMATIC NON-INTERRUPTING REFRESH TECHNIQUE

[75] Inventor: Hubert G. DeVries, Littleton, Colo.

[73] Assignee: Monolithic Systems Corporation, Engelwood, Colo.

[22] Filed: Jan. 22, 1973

[21] Appl. No.: 325,688

[52] U.S. Cl. ....... 340/173 DR, 340/173 R, 307/238

[51] Int. Cl. ............................................ G11c 11/40

[58] Field of Search .............................. 340/173 DR

[56] References Cited

UNITED STATES PATENTS

| | | | |
|---|---|---|---|
| 3,631,408 | 12/1971 | Kubo | 340/173 DR |
| 3,727,196 | 4/1973 | McKenny | 340/173 DR |
| 3,729,722 | 4/1973 | Shuba | 340/173 DR |
| 3,736,572 | 5/1973 | Tu | 340/173 DR |
| 3,737,879 | 6/1973 | Greene | 340/173 DR |

*Primary Examiner*—Terrell W. Fears
*Attorney, Agent, or Firm*—Daniel M. Rosen

[57] ABSTRACT

An automatic refreshing arrangement for a semiconductor memory including a plurality of memory cells arrayed in rows and columns, and wherein each of the memory cells has the characteristic of decay of its stored level. Each memory cell is provided with a read line, a write line and an access line, each of the cells having the storage decay refreshed to its original level by application of a write pulse to the line. A logic control circuit responds to read and write inputs to supply refresh pulses in a manner which does not interfere with the timing operation of the memory. Particularly, a time delay network is described which provides a write pulse following each successive read pulse, and an automatically generated write pulse in the event that no read or write input is provided to the memory within a predetermined time period. In addition, circuitry is provided for disconnecting the operation of the automatic write generation in the event that a read or write input pulse appears prior to the termination of the predetermined time period.

10 Claims, 4 Drawing Figures

AUTOMATIC NON-INTERRUPTING REFRESH TECHNIQUE

Figure 1:
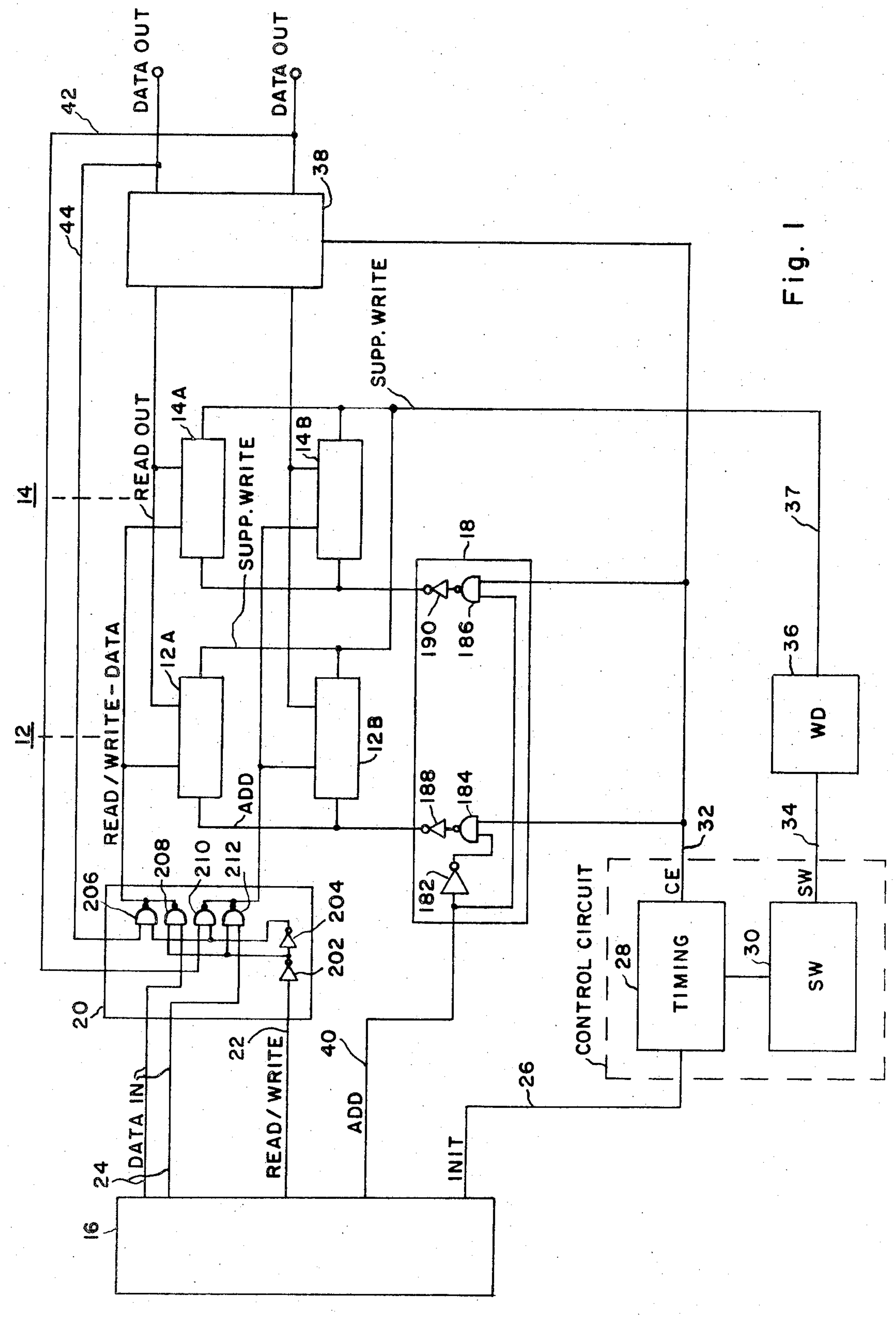

This invention relates to semiconductor memories and more particularly to a control and timing logic circuit for supplying refresh pulses in a manner which does not interfere with the access timing operation of the memory.

The use of semiconductor memories employing integrated circuit techniques have been developed and commercialized to a large extent. These memories possess certain inherent advantages over prior memories employing magnetic core and like magnetic switching devices in that their speed of operation is significantly higher, their manufacture may be completely automated and, as auotmation techniques continue to improve, their economy is of significant advantage. The most conventional form of integrated circuit semiconductor memories employ metal oxide semiconductor field effect transistors preferably utilized in an integrated circuit designed on a monolithic substrate. Digital memory cells utilizing metal oxide semiconductor field effect transistors and memory arrays made up of such devices are well known to those skilled in the art. For example, U.S. Pat. No. 3,447,137 issued to R. Feurer discloses such apparatus.

The conventional form of operation of a semiconductor memory device employing field effect transistors utilizes the concept of trapped charge in a capacitor. A detailed description of trapped charged devices illustrated in U.S. Pat. No. 3,448,295 issued to F. M. Wanlass. Most conventionally, these memory cells are in the form of a three switch cell having a data storing element or node associated with one of the switches. As conventionally employed, each of the switches is a field effect transistor, the associated address logic circuitry also being formed of field effect transistors and the entire systems being thereby readily fabricated onto a single semiconductor ship.

The storage element in such an arrangement is in the form of a capacitive element which may be either a discrete physical capacitor or a capacitor formed on the semiconductor material. It has been found that the signal level stored on the capacitive element tends to dissipate or leak from the element so that it becomes necessary to periodically regenerate or refresh the signal level on that element. In prior art arrangements, many forms of devices and apparatus have been employed to effect the refreshing operation. The nature of the semiconductor memory cell is such that a write signal applied to the cell will effect a refresh operation. A read signal however will not result in refreshing the content of the memory, since the read operation will effect only the transference of the node charge to suitable output circuitry or other suitable means of sensing the stored condition. In such systems therefore it is necessary that means for providing a specific refresh operation be provided in order that the memory may be continuously effective A disadvantage of conventional refresh is that the memory becomes unavailable for accessing by external accessing devices during the refresh operation. For example, where a timing circuit is employed to refresh the memory at regular intervals by an appropriate refresh pulse, the memory is unavailable for the duration of the refresh pulse. The refresh operation effectively disconnects the drive circuitry from the computer or other accessing device, and substitutes a refresh pulse source, thereby rendering the memory not only inaccessible but in fact unavailable. Thus, if a computer attempts to access, in the form of a read instruction, at the same time that a refresh pulse is applied, the computer must wait for the termination of the refresh pulse prior to the read cycle beginning. Furthermore, if a sequence of read pulses is being applied to the memory it is necessary to interrupt these read pulses at regular intervals in order to provide the refresh pulse. Interruption of the read cycle slows down the effective access time to the memory and requires provision be made for suitable control to compensate for the occasional break in the regularity of the read cycle application. In addition, external control is necessary in order to indicate that the memory may be undergoing a refresh cycle during a moment that an access request is presented to the memory.

It is, thus, the principal object of the present invention to provide a novel control and timing logic circuit responsive to read and write inputs to supply refresh pulses in a manner which does not interfere with the timing operation of the memory.

It is an additional object of the present invention to provide a single control circuit which can accomplish a multiplicity of functions concerning refresh operation without interference with the memory unit itself.

It is another object of the present invention to provide a novel control and timing circuit which may be interrupted during a refresh operation for accessing purposes.

It is a still further object of the invention to provide a logic circuit which utilizes standard logic components for providing both non-interfering automatic refresh and timing signals.

The foregoing objects are accomplished, in a semiconductor memory employing a plurality of memory cells arranged in rows and columns, wherein each of the memory cells have a characteristic of storage decay, and wherein each of the memory cells include a read, write and access lines for selectively reading and writing information into a desired storage cell, by providing each storage cell having a storage decay characteristic with a supplemental write pulse generated by virtue of a plurality of conditions. To distinguish the control-generated supplemental write pulse, the computer generated pulse will be referred to as a data write pulse. The first condition results in the generation of a supplemental write pulse during the read cycle after each successive read pulse application by means of a logic control circuit. As a further condition governing the operation of the logic control circuit, a predetermined time period is established during which non-access to a storage cell by a write pulse for refreshing the memory will result in the automatic generation of the supplemental write pulse. The timing of the supplemental write pulse is such that should a read or data write pulse occur prior to or during refresh pulse application, the refresh pulse is blocked and the read or data write pulse is allowed to continue into the memory, thereby preventing any access delay. In addition, the logic control circuitry is employed to provide the timing signals for addressing the cell during the period of time that the data write pulses are applied.

In a preferred form the logic control circuit employs a plurality of monostable devices sequentially oriented to provide the necessary time delay functions. The circuit continually monitors the read and data write pulse input lines and provides the appropriately shaped and timed signals to the specific memory cell undergoing refreshing.

Figure 2:
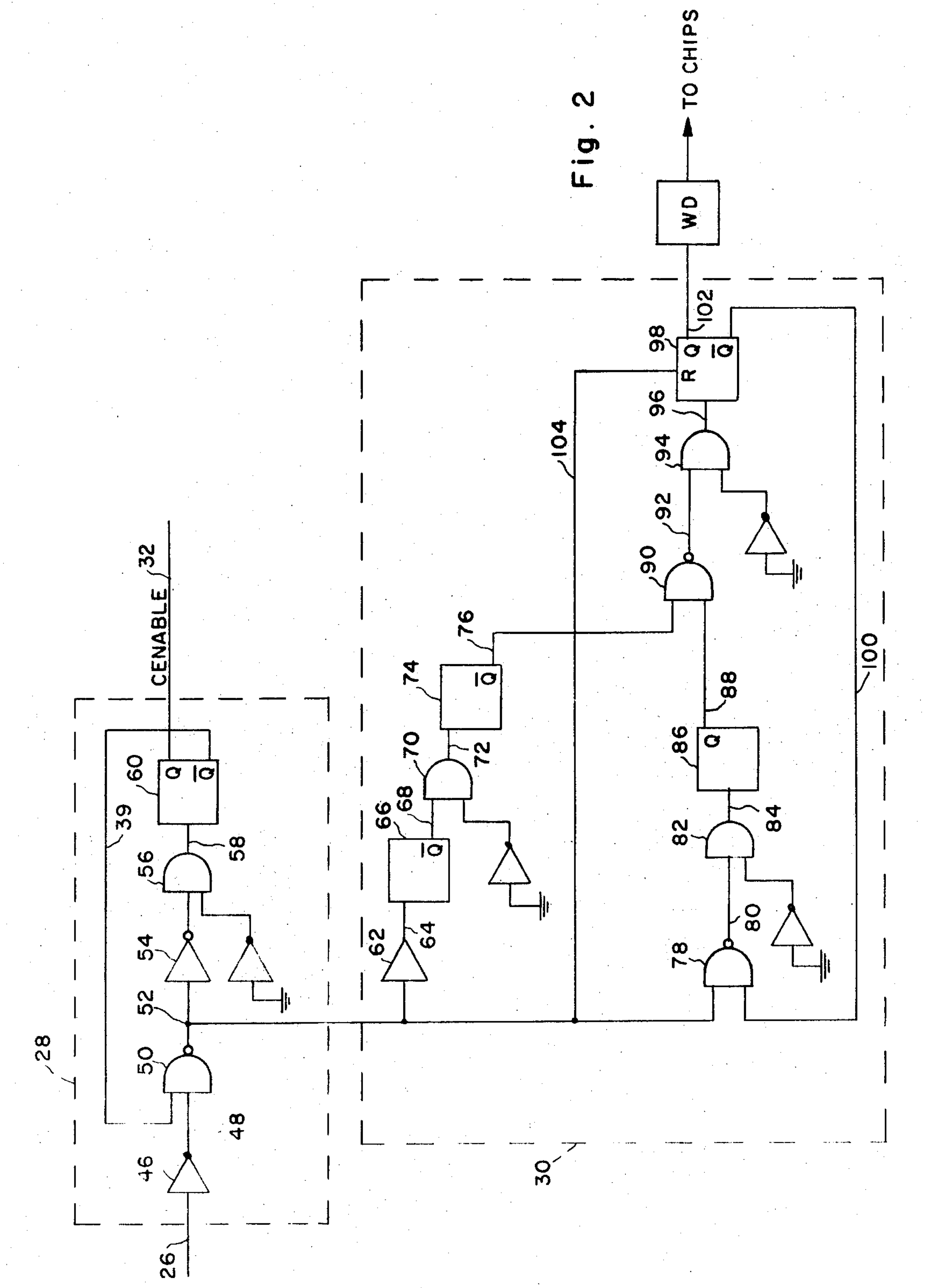
Figure 3A:
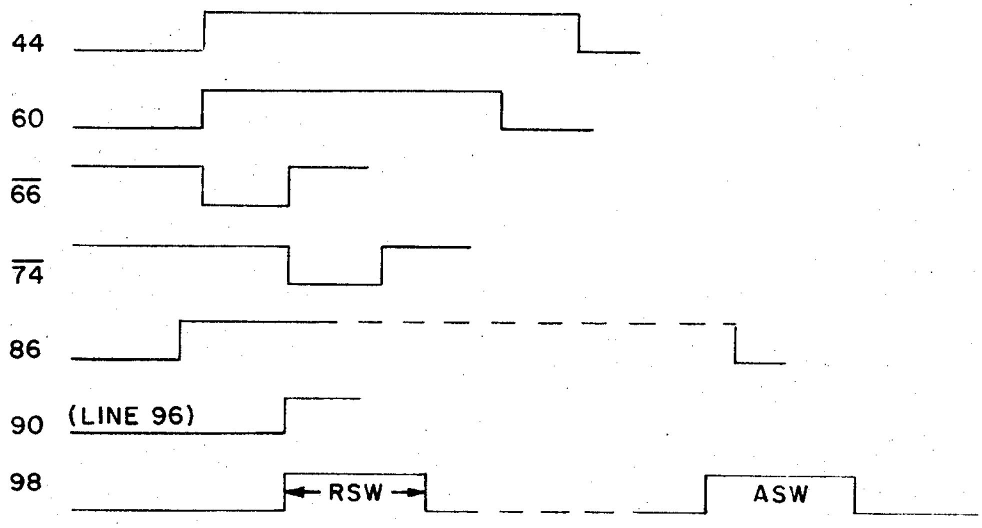
Figure 3B:
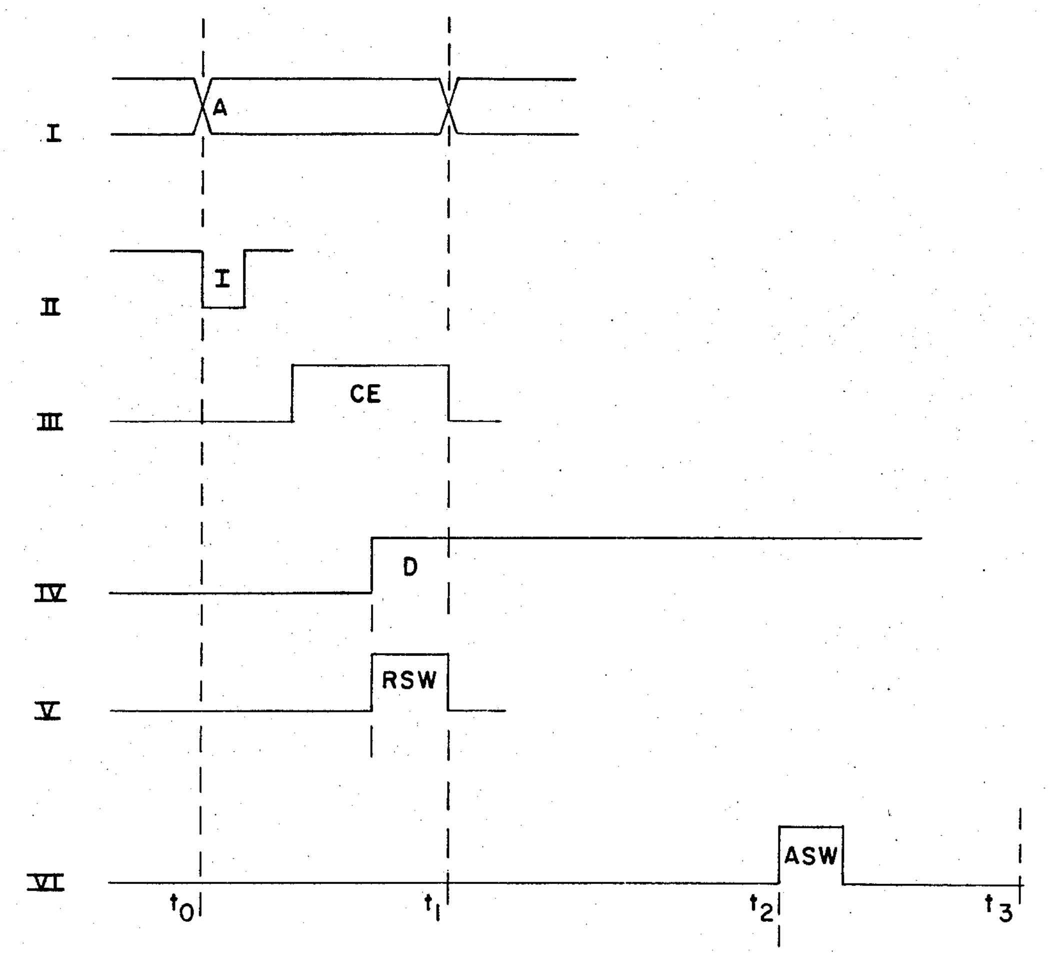

The foregoing objects and brief description will become more apparent from the following more detailed description and appended drawings wherein:

FIG. 1 illustrates a block diagram of a memory organization utilizing the concepts of the present invention, FIG. 2 illustrates in great detail the logic circuitry employed in a preferred embodiment of the specific feature of the present invention, and FIGS. 3A and 3B are a general wave form and timing diagrams of the present invention.

Referring now to FIG. 1, general memory organization is illustrated in conjunction with the concept of the present invention. As shown therein, a semiconductor memory array indicated generally as 10 includes a plurality of memory elements 12 and 14 arranged in a matrix of rows and columns. Each element may comprise a semiconductor chip containing pluralities of storage cells individually addressable or may itself consist of a single storage cell. One typical multi cell chip manufactured commercially is the model EA1500 manufactured by Electronic Arrays, Inc. of Mountain View, Calif. For purposes of illustration, each column is shown as including a first element 12A and a second element 12B, although it will be understood that others, not shown, may be used. A further column, defined as the storage element 14A, 14B and others not shown, is also illustrated. The memory bank, of course, may include additional memory elements further expanding the matrix illustrated as well as including a plurality of matrices interconnected in well known manner providing a complete memory system. In conventional organization, each storage unit memory cell would pertain to a bit of information, with some organization ascribed to pluralities of bits to define data words. For example, each column of the matrix pertains to a memory word location whereas elements of a row pertain to different word locations but define the same bit positions. Elements of the same column are therefore addressed concurrently for word readout, wherein elements of the same row define bit locations within a data word.

Each memory cell is selectively energizable at the intersection of pairs of lines, selection of respective memory elements occurring by means energization of coordinate intersections of the respective pairs of lines. An addressing operation in the form of an enabling pulse coupled with address pulses renders the particular location ready to receive a write or read pulse in accordance with the selected coordinates.

Data which is to be written into the respective memory cells of an addressed word location is received from an external device such as a processor or like device, shown generally as 16, which may be a standard form of information source such as a data line, computer, data processor, or like information supplying device. The data processor 16 supplies address information as well as read and write signals to a memory location in a manner to be described further below.

As illustrated herein, address locations received from the processor 16 are placed into column selection gating network 18 which in turn has each of each of its respective outputs coupled to corresponding respective word or column lines. The read/write and data signals are coupled through a row gating network 20 corresponding to the respective bit or row lines.

The selection of the storage element for performing a specified function is accomplished by energizing appropriate pairs of lines, the intersection of which determine the location of the specific storage element. As was stated above, the storage element may consist of a chip containing many pluralities of individual storage cells or may itself be a single cell. For ease of illustration, selection of a single chip is illustrated by means of intersection of single pairs of lines. It will be understood, however, that the addressing of each successive chip may comprise pluralities of address lines for selecting individual storage cells within the chip.

As illustrated, read and write information is supplied from the data processing source 16 along a read/write line 22 to the column gating network 20. Data is supplied from the processor 16 along the data in line 24 to the column gating network 20. Initiation signals for beginning the timing operation are derived along the line 26 from the data source 16 and applied to a timing circuit 28 and in turn to a supplemental write circuit 30. The output of the timing circuit 28 is supplied along a line 32, termed an enable line, while the output of the supplemental write circuit 30 is supplied along a supplemental write line 34 to a write driver 36. The output appearing along the line 32 is fed to the column selection gating network 18 and in turn coupled to the chips defining each respective column. The output derived from the chips is placed into a data output register 38 and fed to some form of utilization device not shown along data output lines. In addition, the data read out into the register 38 is fed back from the data output lines to the row selection gating network 20.

The general operation of the arrangement of FIG. 1 will now be described in greater detail. Initiation of the operation of the memory occurs by application of a read or write pulse along the line 22. The read or write pulse is applied through the row selection gate 20 along each respective row line. The address of the proper chip is provided by means of an appropriate signal along the address line 40 to the column selection gate 18. The address pulse enables the appropriate gate within the column selection gating network 18 and responds to a timing pulse produced by the circuit 28 and in response to an initiation pulse provided along the line 26 for selecting the appropriate column. If the operation is a read operation, then the pulse applied along the line 22 is applied without corresponding data impulses applied along the lines 24 and the chips corresponding to the selected column respond by transferring their nodal charge as described above along their output read lines to the data register 38. If the operation has been a write, then the application of a pulse along the line 22 would have taken place along with the application of a data impulse along the lines 24, resulting in a write data signal being applied from the selection gating network 20 through the appropriate columns selected in accordance with the address pulses provided along the line 40. In this case, data would have been written in to the appropriate column in accordance with the data being supplied along the data in lines 24.

As was noted above, it is the nature of the semiconductor memory cell to store information in a form represented by a capacitive charge. It is the nature of the capacitive charge to tend to dissipate as by leakage and, therefore, to lose its informational state. To prevent this loss of information, it is desirable to refresh the semiconductor memory. It is also the nature of the semiconductor memory that application of a write pulse and appropriate data level along the respective write lines, etc., acts to restore the capacitive charge level and, therefore, refresh the memory. It is a further characteristic of the memory device that application of a read pulse along an appropriate read line does not so act to refresh the memory. It is a further characteristic that the absence of a pulse for a prolonged period of time along the write line, as by inactivity with respect to a chip or by a succession of read pulses applied to that chip, will both act to result in a slow dissipation of the stored charge. To prevent this occurrence, the present invention utilizes a control circuit including the logic timing circuit 28 and supplemental write control circuit 30, illustrated generally in FIG. 1, and which responds to both the initiate signal applied along line 26 from the processor 16 for beginning the timing process. The logic timing circuit 28 also acts to supply the enable along output line 32. The control circuit initiate pulse is generated in accordance with the timing of the address signals to provide timing control. The nature of the control circuit is to act in response to a read pulse to generate a supplemental write pulse along line 34 immediately thereafter and during the read cycle time frame, to the write driver 36, in a manner so as to refresh the memory. In this manner, the memory is refreshed by the supplemental write pulse following each read pulse so that the successive read pulses can follow one another in normal sequence without the necessity for a delay in the read cycles otherwise necessary for the interruption of a refresh cycle. As shown in FIG. 1, the data register 38 includes feedback lines 42 and 44 to provide input data to the row gating network 38 in accordance with the data read out. Thus, the supplemental write pulse applied along the line 37 to the chip array acts to refresh the addressed chip column in accordance with the data stored therein. This supplemental write pulse will be referred to as a read supplemented write pulse. In the absence of a read or write pulse, such as a situation where the processor 16 is not accessing the memory or a particular memory location, the control circuit will act to supply an automatically generated supplemental write pulse during a predetermined time frame which is determined by the period in which a chip must be refreshed in order to maintain its stored informational at a usable level. In a typical configuration, employing the EA1500 chip, for example, this period may be 2 milliseconds. The automatically generated supplemental write pulse, referred to hereinafter as an autosupplemented write pulse, will be provided within a time frame slightly less than the required refresh memory interval. In this manner, the chip may be refreshed during nonaccess. By providing the autosupplemented write pulse in a time period slightly less than the required interval, the appearance of a read pulse from the processor at the moment an autosupplemented write pulse is being generated may be used to automatically terminate the timing cycle leading to the autosupplemented write pulse so as to allow the processor to continue to directly access the memory. Since the read pulse is immediately followed by a read supplemented write pulse, the refresh required takes place within the desired time frame. The timing of a read supplemented write pulse following a read pulse is such that it will occur within the predetermined frame should the autosupplemented write pulse not have refreshed the memory previously.

In addition to the foregoing functions, it is a unique feature of the present invention that the timing circuit 28 of the control circuit may also supply a properly timed chip enable signal along its output line 32 in a manner energizing the chip so as to provide proper coincident excitation with the applied read/write pulse and an addressing signal. This will be explained in further detail below.

Referring now to FIG. 2, a preferred embodiment of the control circuit shown as FIG. 1 is set forth in greater specificity. Thus, as shown, the address line 40 generates the initiate pulse appearing on line 26 by means of appropriate gating not shown which may be synchronously operated in conjunction with an applied clock pulse signal. The initiate pulse is provided along the output line 26 to an inverter unit 46 and from there along the inverter unit output line 48 is a first input of a coincident gate 50. A first channel is formed by the output 52 of the gate 50 through a further inverter 54 to a first input of a further coincident gate 56. The output of the gate 56 is coupled along a line 58 to a monostable multivibrator or one shot circuit 60 of conventional configuration and which provides compelementary outputs Q and Q not. The output Q of the one shot 60 is provided along an output line 32 corresponding to the output line 32 illustrated in FIG. 1.

A second channel is formed by the output 52 of the gate 50 through the first input of an inverter 62 having its output 64 coupled to the input of a one shot 66. The complemented output of the one shot 66 is coupled along an output line 68 to the first input of a further coincident gate 70 which is in turn coupled along its output line 72 to the input of a further one shot 74. The complemented output of the one shot 74 is coupled along a line 76 to provide a time gating signal, the function of which will be explained in further detail below.

The output line 52 of the gate 50 is coupled to a further coincident gate 78, the output of which appears along the line 80 and coupled to the first input of a coincident gate 82. The output of the gate 82 is coupled along the line 84 to a further one shot 86. The uncomplemented output of the one shot 86 is coupled along an output line 88 to an input of a coincident gate 90. The other input of the gate 90 is applied along a line 76 from the one shot 74 as noted above. The output of the gate 90 is coupled along an output line 92 to a first input of a further coincident gate 94. The output of the gate 94 is coupled along an output line 96 to the input of a one shot 98. The complemented output Q not of the one shot 98 is coupled along an output line 100 to a further input of the gate 78. At the same time, the output of the gate 50 is fed along a line 52 to a reset input of the one shot 98 for purposes which will become apparent below. The uncomplemented output of the one shot 98 is coupled along an output line 102 and coupled to the write drivers 32A, 32B as shown in FIG. 1.

The operation of the foregoing described circuit of FIG. 2 will now be set forth. The initiate pulse is generated in accordance with the address pulse timing to start circuit operation. For purposes of this explanation, states representing logical 1's and logical 0's will be employed, although it will be understood that opposite states in a complementary sense may also be employed, and that other forms of logic configurations may also be employed to produce the same effective result.

The coincident gating employed is either fo the NAND gate or the AND gate configuration. The NAND gate is illustrated by means of a dot at the output.

The NAND configuration, as is well known, will provide a change in output state upon a coincidence thereon of two logic 1 inputs. As shown in FIG. 2, and with reference to the timing diagram of FIG. 3A a negative going initiate pulse along the line 44 is inverted by the gate 46 so as to provide a logic 1 along the output line 48. The one shot or monostable multivibrators described in conjunction with FIG. 2 will for purposes of this explanation be assumed to produce a logic 0 from the complementary output Q not when in their triggered condition, and a logic 1 when in their normal state. The nature of the one shot is that when triggered by a logic 1 at its input, it will switch from its normal state to its triggered state for a time period predetermined by means of the internal parameters designed into the one shot in a manner which is well known in the art. Thus, the one shot 60 when in its normal configuration provides a logic 1 along the feed-back line 38 to the other input of the gate 50. Coincidence of two logic 1 inputs to the gate 50 results in a change in state or a logic 0 to appear along the line 52 which initiates several actions. In the first channel or timing chain of the control circuit, the logical 0 is inverted in the inverter 54 to a logic 1 which is applied to the input of the gate 56. The alternate input of the gate 56 is held at ground potential, and inverted to logic 1 input to produce a change in state or logic 1 at the output of the gate 56 which is fed in turn along the output line 58 to the one shot 60 The logic 1 output of the gate 56 triggers the one shot 60 into its triggered condition for its predetermined period of time, as a result of which the complementary output Q not reverts to a logic 0 and the uncomplemented output Q applied along the output line 32 reverts to a logic 1. This condition is maintained for the predetermined time period set into the one shot 60. As a result of the Q not output of the one shot 60 reverting to a 0 condition, the input to the gate 50 corresponding to the Q not output of the one shot 60 reverts to a 0 condition, thereby changing the state along the output line 52. In the meantime, however, the 0 condition along the output line 52 was applied through the inverter 62 to the one shot 66. Inversion of the logic 0 by the inverter 62 results in a logic 1 applied to the one shot 66 thereby triggering a one shot condition in a manner whereby the Q not output of the one shot 66 reverts from a 1 to a 0 condition. The 0 condition maintains itself with a predetermined period determined by the internal timing of the one shot 66. As the end of the predetermined time period, the one shot 66 output Q not reverts to a 1 condition and is passed through the AND gate 70 along the output line 72 as a logic 1 thereby triggering the one shot 74. The Q not output of the one shot 74 thereby also reverts to a logic 0 condition in response thereto, which condition is applied along line 76 to the input of the NAND gate 90.

At the same time, the logic 0 appearing along line 52 has been applied to the NAND gate 78 and to the reset input of the one shot 98. The logic 0 will have the effect of resetting the one shot 98 to its normal or untriggered condition. As a result, the output Q not from the one shot 98 will be a logical 1 and the appearance of the 0 input along the line 52 to the NAND gate 78 will result in a logic 1 appearing at the output 80, resulting in turn in a logic 1 appearing at the output 84 of the gate 82 and triggering the one shot 86. Triggering the one shot 86 will result in the uncomplemented output Q of the one shot 86 switching to a logic 1 on line 88 and maintaining the logic 1 for the duration of the one shot period as determined by the internal parameters thereof. Overlap is provided between the logic 1 period of the one shot 74 and the logic 1 period of the one shot 86 in a manner such that the gate 90 has a 0 condition at the output thereof.

The determination of the overlap of the logic 1 conditions applied to the input of the gate 90 results when the uncomplemented output of the one shot 86 returns to 0, the output of the gate 90 switching from a 0 condition to a 1 condition The 1 condition is applied along the line 92 through the AND gate 94 to the one shot 98. As a result of the application to the one shot 98, the uncomplemented output of the one shot 98 changes from a logic 0 condition to a logic 1 condition and maintains this condition for the duration determined by the internal parameters of the one shot 98. It is this pulse which is applied along the line 102 to the write driver for triggering the refresh mode. The pulse provided along the line 102 is thus a read supplemented write pulse, the timing thereof having been determined by arrangement of the internal parameters of the various one shots employed in the various triggering conditions. The action of the one shot 66 and 74 act to provide proper timing of the appearance of the read supplemented write pulse with respect to the initiate pulse so as to coincide with the addressing. This timing is determined by the appearance of a pulse along the line 32, the appearance of the pulse along the line 32 at least coinciding and preferably overlapping the read supplemented write pulse appearing along the output line 102. The width of this pulse appearing along the line 39 is, of course, as explained above, determined by the internal parameters of the one shot 60. Because the initiate pulse appearing along the line 44 from the gate 40 may be employed for other purposes, and the length thereof not fixed, the output of the one shot 60 fed back along the line 39 to the gate 50 serves to provide the resetting function necessary for causing the state of the line 52 to revert from its 0 back to a 1 condition. Thus, the foregoing description of a read supplemented write pulse indicates that the write pulse appearing along the line 102 in response to an initiate pulse representing a read function will provide refresh to the appropriate chip within a time frame defined by each read cycle. It thus becomes unnecessary to interrupt the read cycles with a refresh cycle. As was described in connection with FIG. 1, the data read out is stored in the data register 38 and then reapplied to the input register, and the timing of the one shots 66 and 74 arranged so as to provide the read supplemented write pulse, thus effectively re-writing the read data back into the addressed chip location. Data is rewritten into the chip in accordance with the same stored address location in a manner which results in the data being reapplied to the chip from which it was just read out, thereby restoring the data. Also, the application of the refresh pulse to the supplemental write input of each chip serves the additional advantage of refreshing both the chips energized by the enable pulse and all the chips coupled to the driver associated with the read supplemented write pulse generated. The circuit as illustrated also provides secondary advantage of providing a properly timed chip enable pulse in response to the initiate pulse input.

The next condition the timing and control circuit is designed to compensate for results from inactivity caused by non-access of a chip by either a read or a write pulse for a period of time exceeding that which is determined as the minimum time period necessary before information stored at a location in a chip begins to dissipate below a usable value. In this situation, the auto supplemented write pulse is automatically generated by the control circuitry in the following manner. As will be noted by the previous description, the one shot 86 had been left in its triggered condition. The output of the one shot 74 appearing along the line 76 is in a logical 1 state as a result of having reverted at the end of its time cycle. Thus, as long the remaining input to the gate 90 remains at logic 1, corresponding to the triggered output of the one shot 86, the one shot 98 will remain in its quiescent condition. The one shot 86 has been retriggered as a result of the complemented output of the one shot 98 reverting from its logic 1 state to a logic 0 state which in turn passes a logic 1 from the output of the gate 78 to the input of the one shot 86, resulting in the one shot 86 being retriggered. Should the one shot 98 fail to retrigger, as a result of the absence of an initiate pulse along the input line thereof, the one shot 86 will eventually revert to its initial state causing the logic output of the one shot 86 to revert from a logic 1 to a logic 0. As a result, the output of the gate 90 will revert from a logic 0 to a logic 1, triggering the one shot 98. Thus, an auto supplemented write pulse will be triggered of an appropriate duration and applied so as to refresh the stored condition of the associated chips. The auto supplemented write pulse is effectively inhibited by the appearance of a subsequent initiate pulse appearing within the preset time condition. The inhibit takes place by applying the pulse from the line 52 to the reset input R of the one shot 98 along the line 104.

Referring to FIG. 3A, the specific timing of the logic components of FIG. 3 is graphically illustrated. The legends on each of the curves correspond to the logic components of FIG. 3. As shown, the one shot 98 produces a read supplemented write pulse (RSW), and a later auto supplemented write pulse (ASW) upon failure of a subsequent initiate pulse to appear.

Referring to FIG. 3B, the general data timing relationship is shown. Specifically, curve I shows the address input (A), which can be either a "1"-or a "o"-, shown as respectively opposite pulses. Curve II shows the timing of the initiate pulse (I) generated in accordance with the addressing pulse. Curve III illustrates the timing of the chip enable (CE) pulse generated by the timing circuit 18 in response to the initiate pulse. Curve IV illustrates data (D) read out, assuming a read cycle, and curve V shows the read supplemented write pulse (RSW) timed to rewrite data in accordance with the data read out. The cycle occupies a time frame of $t_0 - t_1$. The Curve VI illustrates the timing assuming no initiate pulse, signifying failure to address a chip, for the time frame determining the refresh period, here $t_3$. The auto supplemented write pulse (ASW) is thus generated at a time period $t_2$, the difference between time periods $t_2$ and $t_3$ corresponding to $t_1$, or the time a read operation would take to provide refresh by means of teh read supplemented write pulse. Thus, appearance of a read pulse as late as $t_2$ would still effectively refresh prior to $t_3$. The ASW pulse refreshes all chips, by virtue of the connections thereto as shown in FIG. 2, in accordance with the data condition of the output register.

Therefore, by providing a specific time period as defined by the internal parameters of the one shot 86, which designed time period is planned to be less than the read cycle duration, the application of a read pulse from the computer indicating that access to the memory is desired will result in immediate resetting of the one shot 98 in the manner described aforesaid and result in a corresponding resetting of the triggering period of the one shot 86. Thus, no interruption of the read cycle is necessitated by the requirement of accessing to the memory during the refresh period.

The column and row selection gating networks 18 and 20 illustrate logic arrangements wherein data is written into the array. The network 18 includes an inverter 182 coupling the address line 40 to a coincident gate 184. A further coincident gate 186 is ooupled directly to the address line 40. Inverters 188 and 190 couple the respective gate outputs directly to the array. Column selection is by supplying 1's and 0's along the address line. A "0" selects the first column and a "1" the second. The network 20 includes first and second inverters 202 and 204 connected to the read/write line 22, and four coincident gates 206, 208, 210, and 212. The read/write line supplies either a "1" or a "0" in accordance with whether the operation is to be a read or a write. A read operation enables gates 206 and 210 such that the appearance of a supplemental write pulse will result in data on the lines 42 or 44 to pass the gates 206 and 210 to the addressed column in accordance with the activation by the column selection network 18. A write operation enables the gates 208 and 212 which receive their respective data inputs directly from the data source for entering into the array.

Obviously, as rows and columns are more prolifigate, the logic selection is likewise expandable to accommodate and other logic forms may be employed to gate data from the rewrite source 38 or from the data source 16 into the array, the embodiments described above being merely illustrative of a suitable technique. Thus multiple bit addressing will be used in selecting where larger numbers of rows and columns are employed in the array.

As stated briefly above, the illustration of a 2 × 2 array is exemplary. The memory may operate by providing a single chip with a plurality of bit stored locations, each of the locations addressable by means of selected activation of a plurality of chip address input lines. The entire chip is rendered susceptible to read and write operations by means of separate pulsations provided along a chip enable input line. A single read-write line is utilized, the presence of a write pulse indicating the presence of information to be written at location determined by addresses selected by means of external address devices. The read pulse, which may be manifested by the absence of a write pulse, indicates that a read operation is to occur at the chip location selected by the address location devices. The absence of write pulse indicating a read operation results in a transfer of the stored charge at a particular chip location to the data register 38 in the manner described above. As part of the operation, the automatic rewrite feature of the present invention utilizes the information readout to be restored and reinforced in its proper form in the chip corresponding to the address location previously read. The presence of a chip enable pulse, and the supplemental write pulse, results in restoration and reinforcement of the data read out into its previously read out location by means of a selective writing described above. To those chips receiving a supplemental write pulse but not a chip enable pulse, the nature of the chip as described above permits the write pulse to perform a refresh function, resulting in reinforcement of the data stored in the non-selected and non-chip enabled storage locations.

Thus, what is described is a technique which enables the refresh operation of a semi-conductor memory to be accomplished in a manner which does not cause a time delay. Specifically, the generation of a read supplemented write pulse within the read cycle does not affect access time, and the use of an auto generated write pulse within a time frame permitting a read signal to reset the auto supplemented write pulse produces the same effect. Also, the use of a novel control circuit for accomplishing both functions described above as well as providing the array timing enable signals results in convenient and efficient semiconductor memory array operation.

The invention as described is obviously not limited to the specific embodiments disclosed as exemplary, but will include all obvious variations, changes and modifications thereof within the spirit and scope of the present invention. For example, although a one shot or monostable multivibrator is disclosed, it is obvious that other equivalent timing devices may be employed for generating signals after predetermined time periods in accordance with the invention. Other obvious equivalents, such as positive and negative logic, may also be employed within the spirit and scope of the present invention.

What is claimed is:

1. A semiconductor memory array comprising a plurality of memory cells arrayed in rows and columns, each of said memory cells having the characteristic of storage decay over a decay period, each of said memory cells including a read/write line and an address line, each said cell having said storage decay refreshed by application of a write pulse to said cell, means for supplying address pulses to said array, each of said address pulses-initiating a read/write cycle, and logic control means responsive to said address pulse for supplying a supplemental write pulse after each read pulse to said memory array prior to the end of each said decay period associated with each said read pulse.

2. The combination of claim 1 wherein said cells each include an enable line, said logic control means includes a timing circuit and a supplemental write pulse circuit, said timing circuit responsive to initiation of a ready cycle for applying an enable pulse to said cells, said supplemental write circuit responsive to said initiation to generate a supplemental write pulse coincident with said enable pulse.

3. The combination of claim 2 wherein said supplemental write circuit generates a further supplemental write pulse in response to the absence of said initiation for the major portion of said decay period.

4. A semiconductor memory array comprising a plurality of memory cells arrayed in rows and columns, each of said memory cells operative over a predetermined read cycle initiated by an initiate signal, said cell having the characteristic of storage decay over a decay period, each of said storage cells including a read/write line, an address line, an enable line, and a supplemental write line, a source of data for supplying read/write signals, address signals and data, said source supplying said initiate signals timed to correspond to address signals, a control circuit, said control circuit responsive to said initiate signals for generating an enable pulse and a supplemental write pulse, said control circuit including a timing circuit for generating said enable pulse and applying said enable pulse along said enable line, and a supplemental write circuit for generating said supplemental write pulse and applying said supplemental write pulse along said supplemental write line, said supplemental write circuit including first means responsive to said initiate signal for generating said supplemental write pulse within a read cycle and coincident with said enable pulse, and second means for generating a further supplemental write pulse within said decay period in the absence of a further initiate signal.

5. The combination of claim 4 wherein said control circuit includes means for inhibiting the operation of said further supplemental write pulse in response to an initiate signal within the decay period occurring prior to a predetermined time period.

6. The combination of claim 5 wherein said predetermined time period is determined by the time duration necessary for said initiate signal to generate said first named supplemental write pulse prior to the end of said decay period.

7. The combination of claim 4 wherein said timing circuit includes a gated monostable circuit operative in response to said initiate signal for producing said enable signal for a predetermined time period.

8. The combination of claim 4 wherein said supplemental write circuit includes a first monostable multivibrator having a first triggered state corresponding to said first named supplemental write pulse, and a second triggered state corresponding to said further supplemental write pulse.

9. The combination of claim 8 wherein said supplemental write circuit includes a second monostable multivibrator responsive to said initiate signal to enter a triggered condition and to maintain said triggered condition for a predetermined time period, said further monostable multivibrator responsive to each successive initiate signal for maintaining said triggered state, means coupling said first monostable multivibrator to said second monostable multivibrator, said first monostable multivibrator responsive to loss of triggering of said second monostable multivibrator for providing said further supplemental write pulse.

10. A semi-conductor memory array comprising a plurality of memory cells arrayed in rows and columns, each of said memory cells having the characteristic of storage decay over a decay period, each of said memory cells including a read/write line and an address line, each said cell having said storage decay refreshed by application of a write pulse to said cell, means for supplying address pulses to said array for addressing at least one cell thereof, said means for supplying addresses initiating a read/write cycle for applying read/write pulses to the location addressed, and logic control means responsive to said means for applying addresses for supplying a supplemental write pulse after each read pulse generated by said read/write cycle to all of said plurality of cells of said memory array prior to the end of each said decay period associated with each said read pulse.

* * * * *

UNITED STATES PATENT OFFICE
CERTIFICATE OF CORRECTION

Patent No. 3,858,184 Dated December 31, 1974

Inventor(s) Hubert G. DeVries

It is certified that error appears in the above-identified patent and that said Letters Patent are hereby corrected as shown below:

Column 6, line 19, "is" should read --to--.

Column 7, line 3, "fo" should read --of--;

line 35, after "60" insert a period;

line 55, "As" should read --At--.

Column 9, line 56, "18" should read --28--;

line 67, "teh" should read --the--.

Column 10, line 20, "oopled" should read --coupled--.

Signed and Sealed this

*fourth* Day of *November 1975*

[SEAL]

*Attest:*

RUTH C. MASON
*Attesting Officer*

C. MARSHALL DANN
*Commissioner of Patents and Trademarks*